Patented Sept. 3, 1940

2,213,726

UNITED STATES PATENT OFFICE 2,213,726

COMPOUNDS OF THE PHTHALOCYANINE SERIES

Max Wyler, Blackley, Manchester, England, assignor to Imperial Chemical Industries Limited, a corporation of Great Britain No Drawing. Application July 6, 1938, Serial No. 217,817. In Great Britain July 10, 1935

10 Claims. (Cl. 260—314)

This application is a continuation-in-part of my application Serial No. 90,008, filed July 10, 1936 (Patent No. 2,197,458, issued April 16, 1940) and deals with the production of novel compounds of the phthalocyanine series. The latter name applies to a series of colors which were first studied comprehensively by Linstead and his collaborates in the Journal of the Chemical Society (London) for 1934, at pages 1016 to 1039, and whose characteristic structure is discussed at pages 1033 to 1036 of this publication. This characteristic structure may be expressed by the general formula

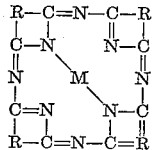

wherein R, R stand for ortho-arylene nuclei of the benzene, naphthalene or anthracene series, while M stands for two hydrogens or a metallic atom or radical. The present invention is particularly concerned with the cases where M is a metal.

More particularly, this invention deals with the manufacture of metal phthalocyanines which possess carboxy radicals in the aryl nuclei of the phthalocyanine complex, and which by virtue of these substituents possess distinctive properties, not found in the general, hitherto known compounds of this series.

It is an object of this invention to provide novel and useful compounds as above defined. It is a further object of this invention to provide a method for synthesizing said compounds. Other and further important objects of this invention, will appear as the description proceeds.

Generally speaking, I accomplish the above objects of my invention, by heating an aromatic polycarboxylic acid in which at least two of the carboxy groups occupy adjacent positions, with a metalliferous reagent in the presence of urea, and in the optional presence of further assistants or adjuvants, such as boric acid, sulfamic acid or ammonium molybdate.

As illustrations of aromatic polycarboxylic acids suitable for this process may be mentioned the benzene-tri- and tetra-carboxylic acids, for instance hemimellitic acid (1,2,3-tricarboxy-benzene), trimellitic acid (1,2,4-tricarboxy-benzene) pyromellitic acids (1,2,4,5 - tetracarboxy - benzene), and mellitic acid (benzene-hexacarboxylic acid). These acids may be employed in the form of the free acids or in the form of their ammonium salts. Also, the anhydrides of these acids formed by the elimination of $H_2O$ from the two ortho-carboxy groups may be employed.

As metalliferous reagents may be mentioned any of the reagents enumerated in my parent application and which are capable of forming stable metal-phthalocyanines; for instance, aluminium, chromium, cobalt, copper, iron and nickel, in the form of free metal or in the form of their oxides, chlorides or other reactive compounds thereof.

When the reagents are heated together a fused mass is formed, and at a temperature of about 200° C. the mass begins to turn green, a metal phthalocyanine being formed. The mass is conveniently stirred to keep it homogeneous. The metal or metal compound used may not, of course, dissolve. The temperature is kept at about 200 to 220° C., or even up to 300° C. if desired, until no more colouring matter is formed, the mass becoming more and more pasty or eventually solid. It is convenient, indeed necessary, to use some excess of urea, as is described in greater detail below. Some ammonia may be evolved. It may be noted here that the generation of ammonia appears to be not directly related to pigment formation, as the yield is not increased by passing gaseous ammonia into the mother mixture, or by adding ammonium carbonate to the reaction mixture.

When free metal is used the temperature of reaction is somewhat higher than 200 to 220° C. and may be as high as 290° C.

In carrying the invention into practical effect it is, as already said, sufficient usually to mix the reagents, to apply heat, stir when the mixture is fluid, and then raise the temperature until pigment begins to be formed. Then to continue to heat or at least to keep hot until pigment formation ceases. The mass is then cooled, ground, suitably washed to remove excess of reagents if any, and purified or treated further as has been described in my parent application above referred to.

It is usually convenient, but not always necessary, to add the metal salt in the anhydrous form; either hydrated cupric chloride ($CuCl_2.2H_2O$)

or the anhydrous salt (Bödkker, Zeitschrift für physikalische chemie, 1897, 22, 506) will serve equally well.

The yield may be improved in certain circumstances by carrying out the operation in a closed vessel so that pressure is generated. It may also be improved by adding as an additional reagent sulphaminic acid or imido-disulphonic acid or nitrilo-trisulphonic acid, or a salt of any of these (as referred to in the specification of copending application Serial No. 82,147, filed May 27, 1936).

The yield may also be improved by adding boric acid. Also, when boric acid is present there is less tendency for frothing to be objectionable. Boric acid appears to have a specific effect; it is not necessary to use so much boric acid as would suffice to give the known boron phthalate (see Berichte der deutsche Chem. Gesellschaft, 36, 2225).

Other useful adjuvants are ammonium molybdate, diammonium phosphate, and any of the other ancillary agents set forth in British Patent No. 476,243.

The quantity of urea employed in the above process should not be less than 1 mol per mol of the arylene polycarboxylic acid employed, but should best be used in large excess. A convenient rule to follow is to use a quantity of urea from 0.6 to twice the weight of the arylene compound.

The novel products of this invention have many of the properties of the known metal-phthalocyanines, but they are also soluble in warm dilute aqueous alkali. There are present, seemingly, carboxylic acid groups. They react with aluminium sulfate or baryta to form water-insoluble lakes. They react further with organic amines to form ammonium salts which are more or less soluble in alcohol, depending on the number of carboxy groups per molecule.

If recrystallization from sulfuric acid is employed as one step in the recovery, the resulting product will naturally be in the form of free carboxylic acid. By neutralization with aqueous ammonia, sodium hydroxide, or any other base, the ammonium, sodium or any other salt of this compound may be optionally prepared.

The compound obtained from trimellitic acid and copper, appears to be a tetra-carboxy compound.

Without limiting my invention to any particular procedure, the following examples are given by way of illustration. Parts mentioned are by weight.

Example 1

50 parts of hemimellitic acid, 100 parts of urea, 5 parts of boric acid and 8 parts of anhydrous cupric chloride are ground together and the mixture heated gradually to 240° C., whereupon the melt is removed from the containing vessel, ground and baked at 300° C. until no more pigment is produced. The bake is then ground and extracted with 1000 parts of water containing enough sodium hydroxide to keep the mixture alkaline. The solid matter is filtered off, dried and dissolved in 10 times it weight of concentrated sulphuric acid; it is then poured into water, filtered, washed with water until neutral and dried. The dry product is a bluish-green crystalline powder, which is slightly soluble in weak ammonia.

Example 2

66 parts of trimellitic anhydride, 180 parts of urea, 16.5 parts of anhydrous cupric chloride, 1.5 parts of boric acid, and 1.2 parts of ammonium molybdate, are mixed and the mixture is heated with stirring at 190° C. for 3 hours. The molten mass becomes almost solid. It is crushed and washed first with about 2000 parts of boiling water, then with 2000 parts of 1% aqueous caustic soda, then with 2000 parts of 0.5% aqueous hydrochloric acid, finally with 2000 parts of water. It is then dried. There is thus obtained a greenish-blue powder, sparingly soluble in dilute aqueous ammonia.

Example 3

10 parts of pyromellitic anhydride, 40 parts of urea, 3 parts of anhydrous cupric chloride, 2 parts of boric acid and 0.1 part of ammonium molybdate, are melted together and kept at 220° C. for 3 hours. The mass obtained is treated as described in Example 2. There is thus obtained a greenish powder with a metallic sheen. This dissolves in dilute aqueous ammonia to give a bluish-green solution.

When mellitic acid is similarly treated the product is bright green and likewise gives a solution in dilute aqueous ammonia.

In a similar manner, carboxy-phthalocyanines may be derived from other metals, by using the appropriate metal or metallic compound. The following metalliferous reagents come into practical consideration; aluminium chloride, chromium fluoride, chromium chloride, cobaltous chloride, ferrous chloride, cuprous chloride, cupric chloride, metallic copper and nickelous chloride.

In lieu of boric acid any of the other assistants or adjuvants above referred to may be employed.

The temperature of the reaction may vary from 200° C. to 300° C., the preferred range being easily determined for each particular pair of materials. For instance, the higher melting polycarboxylic acids, such as mellitic or pyromellitic, will naturally require a higher fusion temperature.

With the higher polycarboxylic acids, some splitting off of $CO_2$ may occur during the heating. It is therefore believed that the resulting compounds may contain less than 4 and will seldom contain more than 8 carboxylic acid groups per molecule.

I claim:

1. A metal phthalocyanine having the empirical constitution $(M'OOC)_x.C_{32}H_{16-x}N_8.M$, wherein M represents a bivalent metal, M' represents hydrogen or a cation forming element or radical, while $x$ stands for an integer not greater than 8.

2. A metal phthalocyanine having the empirical constitution $(HOOC)_x.C_{32}H_{16-x}N_8.M$, wherein M represents a metal selected from the group consisting of aluminium, chromium, cobalt, copper, iron and nickel, while $x$ stands for an integer not greater than 6.

3. A metal phthalocyanine having the empirical constitution $(HOOC)_x.C_{32}H_{16-x}N_8.Cu$, wherein $x$ stands for an integer not greater than 6.

4. The process of producing an alkali-soluble compound of the phthalocyanine series, which comprises heating together urea, a metalliferous reagent and an arylene polycarboxylic acid containing more than two carboxylic acid groups and in which at least two of the carboxylic acid groups occupy adjacent positions.

5. A process as in claim 4, wherein the heating is done in the further presence of an assistant selected from the group consisting of boric acid, amino-sulfonic acids and ammonium molybdate.

6. The process of producing an alkali-soluble copper phthalocyanine, which comprises heating together a cupriferous reagent, urea and an arylene polycarboxylic acid having more than two carboxy groups of which at least two are situated ortho to each other.

7. A process as in claim 6, wherein the heating is done in the further presence of boric acid.

8. The process of producing a coloring matter, which comprises heating together hemimellitic acid, urea, boric acid and anhydrous cupric chloride at a temperature between 240 and 300° C., then extracting the reaction mass with weakly alkaline aqueous solution, and recrystallising the residual solid by dissolving in concentrated sulfuric acid and diluting the solution with water to precipitate the color.

9. A metal phthalocyanine containing carboxy groups in the arylene nuclei.

10. A copper phthalocyanine containing a total of four carboxy groups in the arylene nuclei.

MAX WYLER.